(12) United States Patent
Moore

(10) Patent No.: US 8,453,690 B2
(45) Date of Patent: Jun. 4, 2013

(54) TIRE CHAIN TIGHTENING APPARATUS AND METHOD

(76) Inventor: Steven Dennis Moore, Aloha, OR (US)

( * ) Notice: Subject to any disclaimer, the term of this patent is extended or adjusted under 35 U.S.C. 154(b) by 230 days.

(21) Appl. No.: 12/900,474

(22) Filed: Oct. 8, 2010

(65) Prior Publication Data

US 2011/0088824 A1 Apr. 21, 2011

Related U.S. Application Data

(60) Provisional application No. 61/279,055, filed on Oct. 15, 2009.

(51) Int. Cl.
*B60C 27/16* (2006.01)

(52) U.S. Cl.
USPC ............................ 152/218; 152/217; 152/221

(58) Field of Classification Search
USPC .................. 152/213 R, 213 A, 217, 218, 221
See application file for complete search history.

(56) References Cited

U.S. PATENT DOCUMENTS

| | | |
|---|---|---|
| D24,664 S | 9/1895 | Covert |
| D31,578 S | 10/1899 | Dederick |
| D32,038 S | 12/1899 | Larsen |
| D34,059 S | 2/1901 | Benham |
| D163,469 S | 12/1949 | Moody |
| 3,762,456 A | 10/1973 | Clouston |
| 4,042,000 A * | 8/1977 | Nylund ..................... 152/213 A |
| D247,951 S | 5/1978 | Anthony |
| 4,118,834 A | 10/1978 | Weidler |
| 4,146,075 A | 3/1979 | Riedel |
| 4,182,392 A | 1/1980 | Muller |
| 4,237,951 A | 12/1980 | Dirks |
| 4,306,602 A | 12/1981 | Nestlen |
| D263,460 S | 3/1982 | Leach |
| 4,679,608 A | 7/1987 | Jeindl |
| 4,768,753 A | 9/1988 | Gates |
| 4,919,182 A * | 4/1990 | Proulx et al. ................. 152/221 |
| 5,230,295 A | 7/1993 | Shell |
| 5,255,577 A | 10/1993 | Keefauver |
| 5,284,196 A | 2/1994 | Nielsen |
| 5,307,852 A * | 5/1994 | Preusker ....................... 152/243 |
| D357,402 S | 4/1995 | Roethler |
| 5,682,652 A | 11/1997 | Brody et al. |
| 5,785,783 A * | 7/1998 | Thioliere ...................... 152/216 |
| D411,099 S | 6/1999 | Smith |
| 6,026,876 A | 2/2000 | Snyder |
| 6,089,291 A | 7/2000 | Romolo et al. |
| 6,292,984 B1 | 9/2001 | Nelson |
| 6,341,634 B1 | 1/2002 | Holzwarth |
| 6,530,406 B1 * | 3/2003 | Gentry ......................... 152/217 |
| 6,536,491 B2 | 3/2003 | Martinez |

(Continued)

*Primary Examiner* — Jason Bellinger
*Assistant Examiner* — Jean Charleston
(74) *Attorney, Agent, or Firm* — Gerard Carlson, Agent

(57) ABSTRACT

A tire chain tightener for use on automotive, truck, or other vehicle traction chains and similar devices. The tire chain tightener has an length of elastic material with a hook attached to each end. Intermediate hooks are spaced along the elastic material between the two ends. One of the ends may be uniquely marked with instructions for correct installation of the tire chain tightener. When correctly installed, a tire chain tightener with N+1 hooks will form a symmetrical N pointed star inscribed in the circumference of the tire chains. The star is further centered about the tire. The tire chain tightener exerts a centering force on the tire chains. Since only one hook at a time is installed, the effort to install the tire chain tightener is reduced, enabling people of limited strength to install them.

9 Claims, 11 Drawing Sheets

U.S. PATENT DOCUMENTS

| | | |
|---|---|---|
| 6,915,825 B1 | 7/2005 | Stevenson, Jr. |
| 6,938,306 B2 | 9/2005 | Joubert et al. |
| 7,066,227 B1 | 6/2006 | Stevenson, Jr. |
| 7,096,906 B2 | 8/2006 | Millar |
| 7,174,933 B1 | 2/2007 | Miller |
| 7,181,809 B1 | 2/2007 | Kao |
| 7,219,398 B1 | 5/2007 | Hunt et al. |
| 7,363,952 B2 * | 4/2008 | Arrigoni Neri et al. ...... 152/217 |
| 8,162,016 B1 * | 4/2012 | Le ................................ 152/217 |
| 2003/0102065 A1 | 6/2003 | Picher et al. |
| 2005/0115654 A1 * | 6/2005 | Badham ....................... 152/231 |
| 2007/0169866 A1 | 7/2007 | Lynn |
| 2008/0245458 A1 * | 10/2008 | Langue et al. ............... 152/218 |

\* cited by examiner

TIRE CHAIN TIGHTENING APPARATUS AND METHOD

CROSS REFERENCE TO RELATED APPLICATIONS

This application claims the benefit of the provisional application entitled "Tire Chain Tightening Apparatus and Method" by Steven Dennis Moore, Ser. No. 61/279,055 filed Oct. 15, 2009 and hereby this reference is included in its entirety.

FEDERALLY SPONSORED RESEARCH OR DEVELOPMENT

Not applicable.

JOINT RESEARCH AGREEMENT

Not applicable

SEQUENCE LISTING

Not applicable

FIELD OF THE INVENTION

This invention relates to tire chain tighteners for traction chains used on cars, trucks and other vehicles.

BACKGROUND OF THE INVENTION

Traction devices are used in slippery conditions such as snow, ice and mud. Devices such as diamond chains, link chains, cable chains, traction cables, snow cables and similar devices are herein collectively referred to as tire chains or simply chains. The chains generally fit around the outside of the tire on the tread and are pulled tightly to hold them against the tire. To further tighten the chains against the tire, tire chain tighteners of various types are used to pull the circumference of the tire chains toward the center of the tire.

SUMMARY OF THE INVENTION

A tire chain tightening apparatus, also known as a tire chain tightener, is disclosed. It significantly reduces the movement or working of the tire chains, and reduces the unbalancing of the tire at higher rates of speed. Also reduced are the need to re-tighten the chains and incidences of chain breakage. The tire chain tightener uses a length of elastic material, sometimes referred to as a rope, with hooks attached to each end. A number of intermediate hooks are spaced between the ends and are attached to the length of elastic material. The total number of hooks on the elastic material can vary with the application. In one embodiment the intermediate hooks are arranged such that the elastic material enters each of the intermediate hooks from the direction of the first end and exits the intermediate hooks toward the direction of the second end. This arrangement reduces the wear on the elastic material where it enters and leaves the intermediate hooks. The hook on one end of the elastic material can be marked in some way to indicate the correct installation. Some embodiments use an intermediate hook with an eye, made to contain two passes of the elastic material. A typical eye is in the shape of an oval. A loop of elastic material can pass though the eye and go around a shank that extends outwardly from the eye. The shank further rises out of the plane of the eye to make a J-shaped hook. The plane of the J portion is usually perpendicular to the plane of the eye. In some embodiments, the open hook end of the J-shaped exceeds 180° of curvature. This can reduce the wear of the open hook against a tire. The hook can be manufactured from bent wire, injection molding, casting or other processes. Other embodiments can use an "S", double facing "U" or other hook designs for the intermediate hooks.

In use the user identifies a number of points spaced around the circumference of the tire chains when they are installed on a tire. If there are N points, a tire chain tightener with N+1 total hooks is employed. The hook at one end is first attached to one of the identified points. The next hook in line on the elastic material is attached to another point on the tire chains such that the last hook attaches at about the same point as the first hook. When properly installed, the tire chain tightener forms a symmetrical N pointed star pattern centered about the tire.

The procedure for attaching the tire chain tightener starts with identifying N points around the circumference of the tire chains. A direction, clockwise or counter clockwise, is determined by which of the end hooks is marked. The marked hook at one end of the tightener attaches to a first of the N points. By moving along the circumference of tire chain, the next hook along the elastic material attaches to the next point encountered or to the 2nd, 3rd, 4th, 5th, 6th or 9th point depending upon the total number of points N. By moving around the circumference of the tire chains and attaching the next hook to the appropriate point, the user eventually reaches the starting point with the first hook. The result is the symmetrical N pointed star pattern centered about the tire. Together, the hooks and elastic material pull the circumference of the tire chains toward the center of the tire thus tightening the chains against the tire.

BRIEF DESCRIPTION OF DRAWINGS

The summary above, and the following detailed description will be better understood in view of the enclosed drawings which depict details of preferred embodiments. Like reference numbers designate like elements. It should however be noted that the invention is not limited to the precise arrangement shown in the drawings and that the drawings are provided merely as examples. The features, functions and advantages can be achieved independently in various embodiments of the claimed invention or may be combined in yet other embodiments.

DETAILED DESCRIPTION

Figure 1:
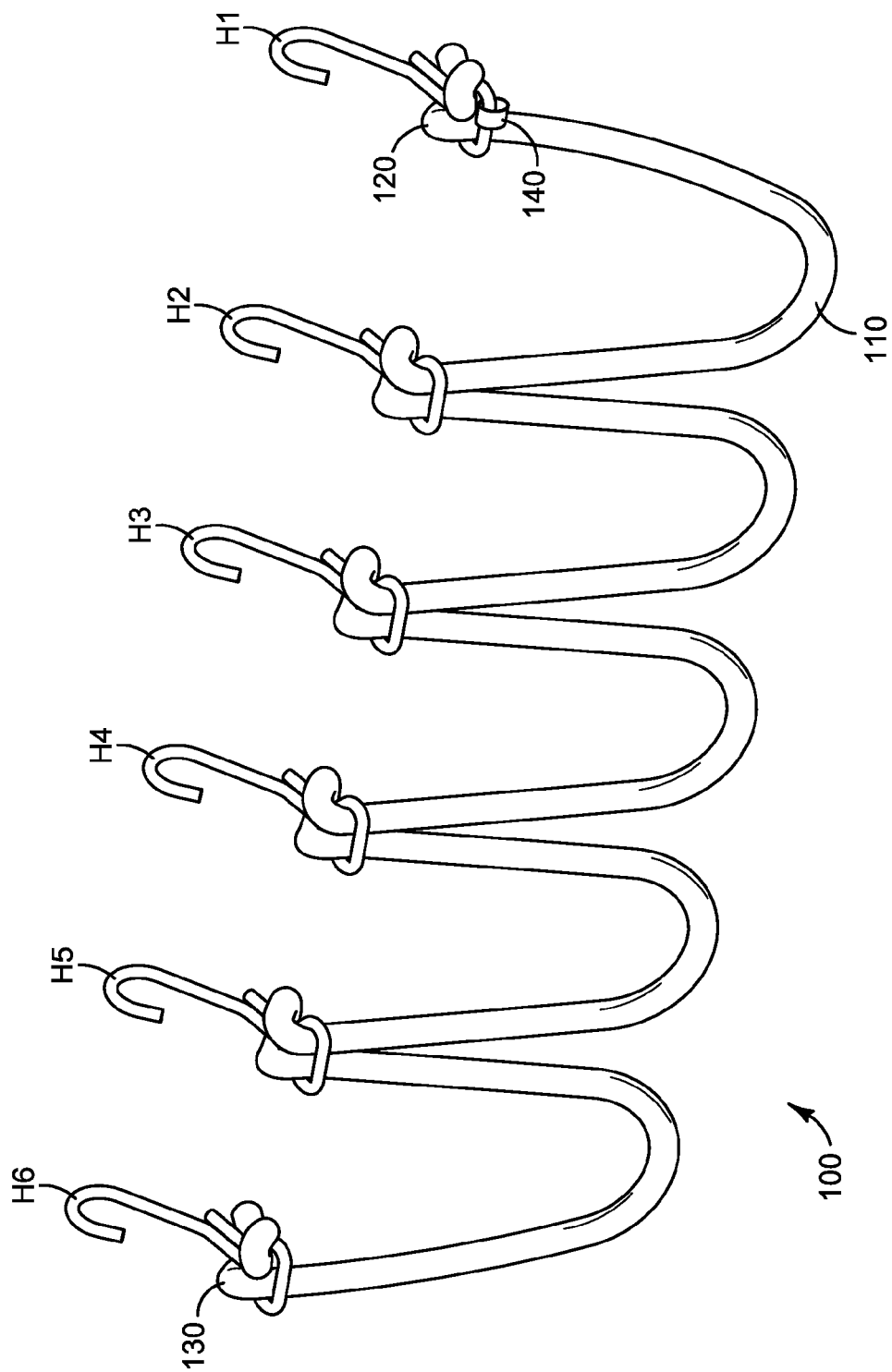
FIG. 1 shows one embodiment of the tire chain tightener.

FIG. 1 shows an exemplary embodiment of the tire chain tightener 100. The tightener 100 has six hooks labeled H1, H2, H3, H4, H5 and H6. The six hooks H1 through H6 are connected together by a linear elastic material 110 which has a first end 120 connected to a first hook H1 and a second end 130 attached to hook H6. To distinguish between the first end and second end, the first end has a marker 140. A number of intermediate hooks labeled H2 through H5 are attached to the linear elastic material spaced between the first end 120 and the second end 130. FIG. 1 shows an embodiment with six hooks. Other embodiments with different numbers of hooks are also possible.

Figure 2:
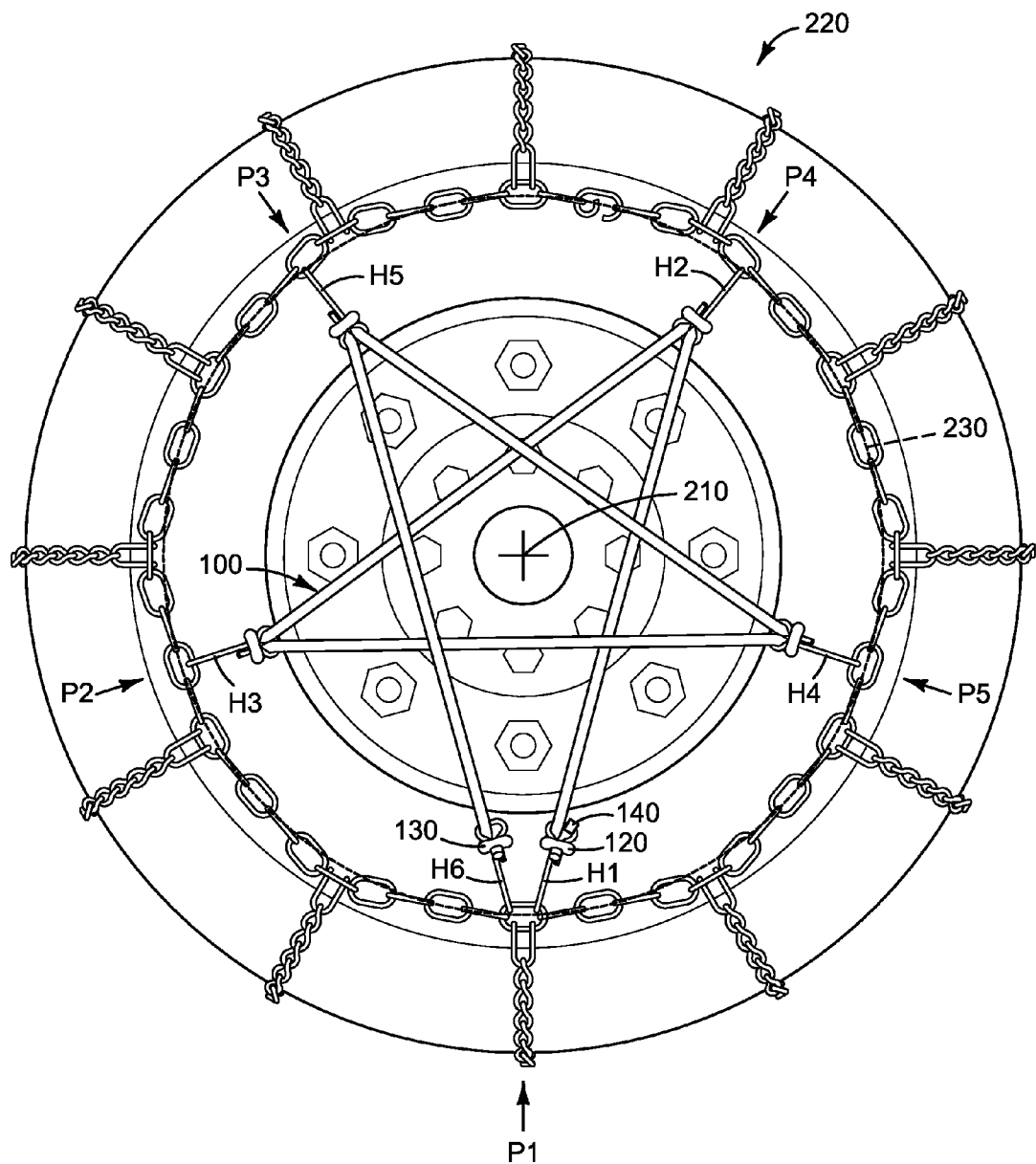
FIG. 2 shows an exemplary installation of the tire chain tightener on a tire with tire chains.

FIG. 2 shows one embodiment of the tire chain tightener 100 attached to the circumference 230 of a set of tire chains 220. Five points P1, P2, P3, P4, and P5 spread around the circumference 230 of the tire chains 220. The six hooks of the tire chain tightener H1, H2, H3, H4, H5, and H6 attach to the five points P1-P5 on the tire chain circumference 230 forming a symmetrical five pointed star inscribed in the circumference 230 of the tire chains 220. The five pointed star is centered about the tire center 210. In this example the number N equals five, the number of points of the star, while the number N+1 equals six or the number of hooks on the tire chain tightener.

Figure 3:
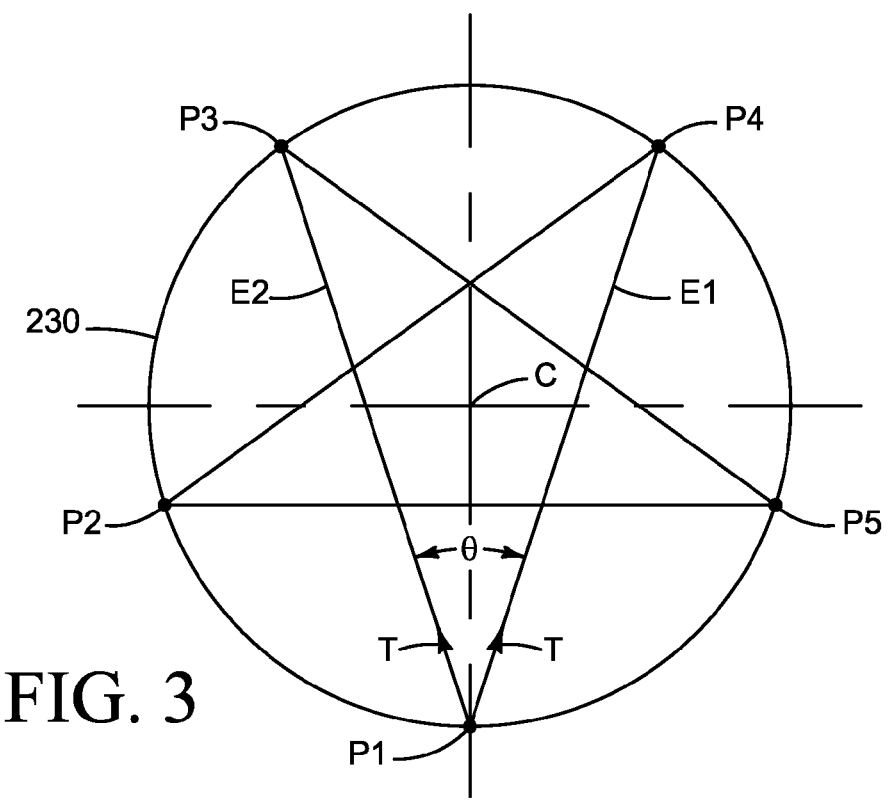
FIG. 3 shows one aspect of the geometry of the tire chain tightener.

FIG. 3 is a geometric abstraction of the tire chain tightener 100 of FIG. 2. The circumference 230 of the tire chains in FIG. 2 are represented in FIG. 3 by the circumference 230 of the circle. In FIG. 3 point P1 has two line segments E1 and E2 representing the elastic material of FIG. 2 which terminates in ends 120 and 130. Each of the segments E1 and E2 assert a tension T at P1. The angle ⊖ between E1 and E2 is 36°. The force exerted on point P1 toward the center C is 2*T*Cos(⊖/2). While this example shows a five pointed star giving ⊖=36°, smaller values of N result in a smaller value of ⊖. N is the number of points on the circumference of the circle representing the points on the circumference of the tire chain in FIG. 2.

Note that, for a given tension, T, as N increases, corresponding to an increased number of points on the star, two things happen:
1) The total Force F increases with increasing N.
2) The value of the Cosine function approaches one, the maximum possible value of the Cosine function.

This is good in that more center directed force may be obtained by increasing the number of points on the circumference of the tire chains. As the number of points increases, the center directed force increases rapidly.

Figure 4:
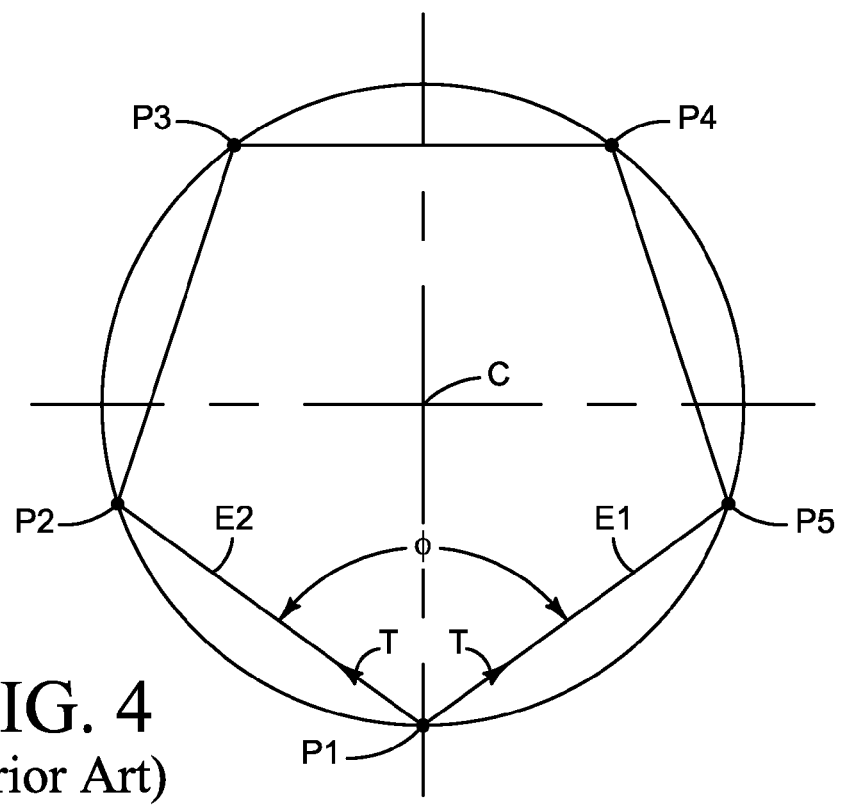
FIG. 4 shows one aspect of the geometry of a prior art design.

FIG. 4 is a geometric abstraction of a prior art tire chain tightener. The tightener of FIG. 4 is a loop of elastic material with five hooks. Each of the hooks connect to one of the five points P1, P2, P3, P4, and P5. The angle φ is the internal angle of the regular polygon inscribed in the circle. The value for φ is: φ=((N−2)*180)/N. Again N is the number of points on the circumference. Thus, for an N pointed regular polygon with a tension T in all the elastic segments, the total force acting in the direction of the center C is:

$$F=2*N*T*Cos(((N-2)*180)/N)$$

Note in the equation above, for a given tension, T, as N increases, corresponding to an increased number of points on the polygon, two things happen:
1) The total Force F increases with increasing N.
2) The value of the Cosine function approaches zero, the minimum absolute value of the Cosine function.

This is problematic in that as the number of points increases, the center directed force increases slowly because the cosine function approaches zero. The various embodiments of the present invention overcome this disadvantage and as will be explained later, make installation easier.

Refer again to the tire chain tightener 100 of FIG. 1. The elastic material 110 can be made from a number of materials including, but not limited to, synthetic or natural rubbers. In some embodiments a metal or plastic spring also works. A purpose of the elastic material is to exert a force along its length when it is stretched. In preferred embodiments, the elastic material 110 is a length of material as opposed to a closed loop. The length depends upon the number of points on the intended star pattern and the size of the tire chain circumference 230. An efficacious length is easily determined by one skilled in the art using the values of tire chain circumference, number of points on the star, the elastic property of the elastic material and the force the user wishes to exert during installation.

The elastic material has two ends, 120 and 130. A first hook H1 attaches to the first end 120. This attachment can be accomplished in a number of ways including, but not limited to, knots, clamps and crimps. In a similar manner the second end 130 attaches to hook H6. Note that for an application intended for a N pointed star, the number of hooks will be N+1 or one hook more than the number of points on the intended star. FIG. 1 shows six hooks for an application intended for a five pointed star. Exemplary values of N include 3, 4, 5, 7, 8, 9, 10, 11, 12, 13, 14, 15, 16, 17, 18, and 19, although other values are possible. The larger the value of N, the more centered directed force is ultimately possible.

Four hooks H2, H3, H4, and H5 are spaced between the first end 120 and the second end 130. Note that for the five pointed star of FIG. 2, there are N−1, or four hooks between H1 and H6 in FIG. 1. These intermediate hooks, H2, H3, H4 and H5 can be fixedly attached to the length of elastic material or slideably attached. In one embodiment the N−1 intermediate hooks are spaced substantially equally between the first hook H1 and the N+1 hook H6.

In one embodiment, the N−1 intermediate hooks are attached to the elastic material, such that they face the same direction. The elastic material enters each of the N−1 intermediate hooks from the direction of the first end 120 and first hook H1, and exits each of the N−1 intermediate hooks toward the direction of the second end 130 and N+1 hook H6.

Figure 5:
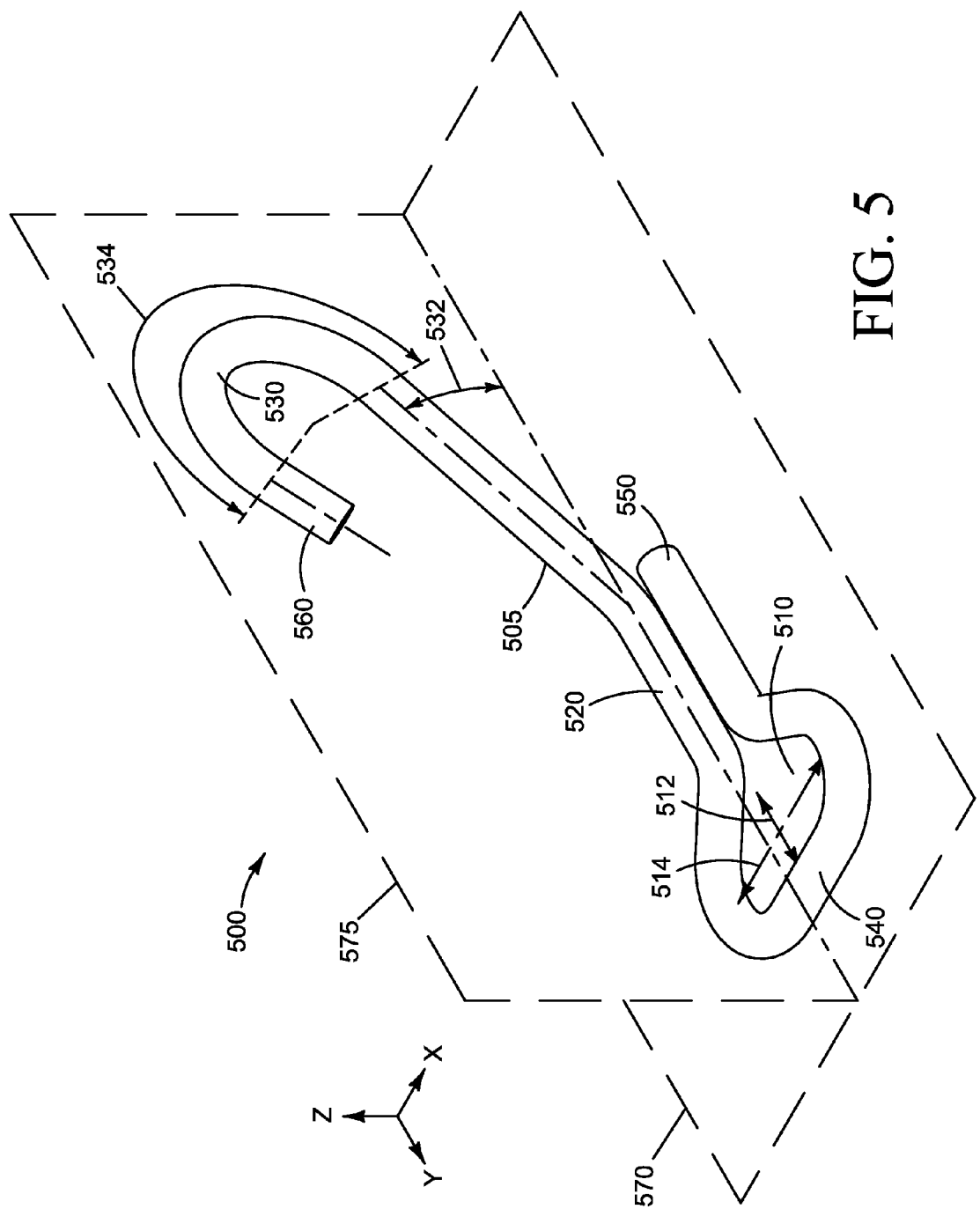
FIG. 5 shows one embodiment of a wire hook used in the tire chain tightener.

FIG. 5 shows an exemplary embodiment of a hook 500. In this embodiment the hook 500 is made from a bent wire segment 505. The wire segment 505 has a first end 560, a second end 550 and an intermediate portion 540. Other embodiments of the hook 500 include hooks made by casting, injection molding or other manufacturing methods. Possible materials include, but are not limited to, plastic, metal, and composites. The hook 500 has an eye 510 in the shape of an oval. In this context an oval means an ellipse, a race track shape or other similar shapes. The eye 510 lies in the first plane 570, having a major width 514 parallel to the X-axis and a minor width 512 parallel to the Y-axis. The major width 514 is longer than the minor width 512. In the embodiment of FIG. 5 the eye 510 is contained in a first plane 570 and is adapted to contain two passes of the elastic material 110 of FIG. 1. In this embodiment the eye 510 has a major width 514 about two cross sectional widths of the elastic material 110. The minor width 514 is about one cross sectional width of the elastic material 110. The internal area of the eye 510 is adapted to contain two passes of the elastic material 110.

The intermediate portion 540 of the wire segment 505 bends in the oval shape to form the eye 510. The first end 560 and second end 550 of the wire segment 505 extend outwardly from the eye 510 parallel to the Y axis. The first end 560 and second end 550 form a shank 520 and lie in the first plane 570 together with the eye 510.

At least one of the ends 550 or 560 extends beyond the shank 520 forming a J-shaped hook portion 530. The J-shaped hook portion 530 is contained in a second plane 575.

The second plane 575 is perpendicular to the first plane 570 and is parallel to the minor width 512. The J-shaped hook 530 rises out of the first plane 570 at an acute angle 532. The J-shaped hook 530 further has a curvature of at least 180° as indicted by the arc and dashed line 534. This curvature helps keep the end of the hook at the first wire end 560 from abrading a tire.

Figure 6A:
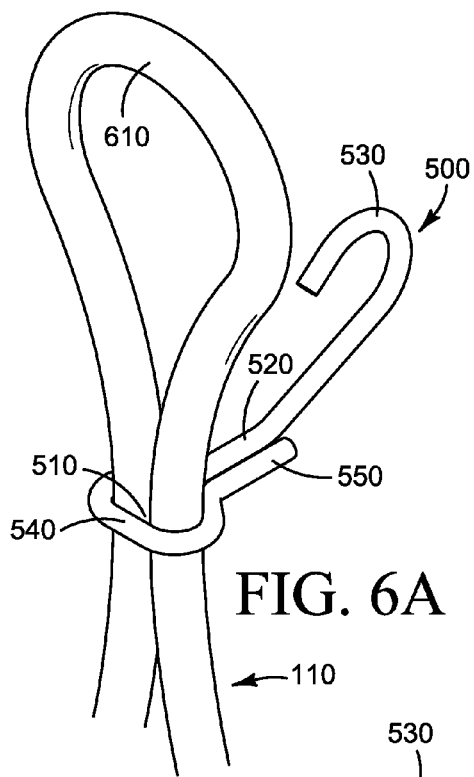
FIGS. 6A-6G show an example installation of an elastic material in the hook of FIG. 5.
Figure 6B:
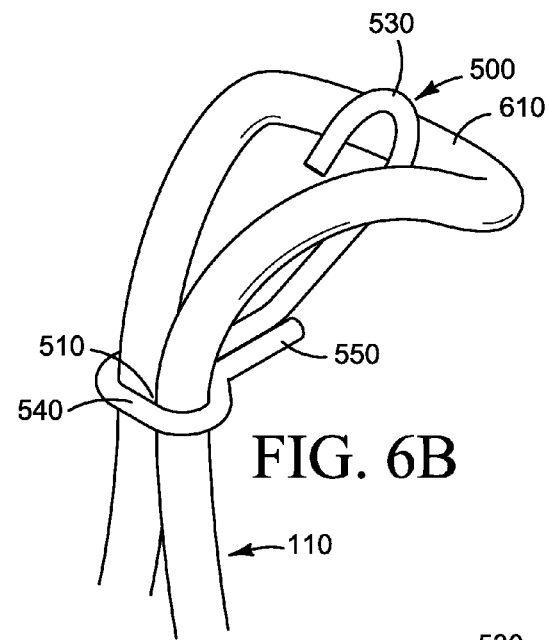
Figure 6C:
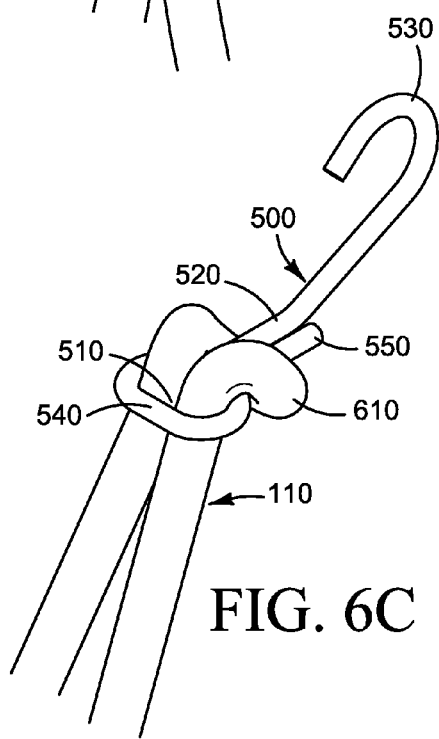
Figure 6D:
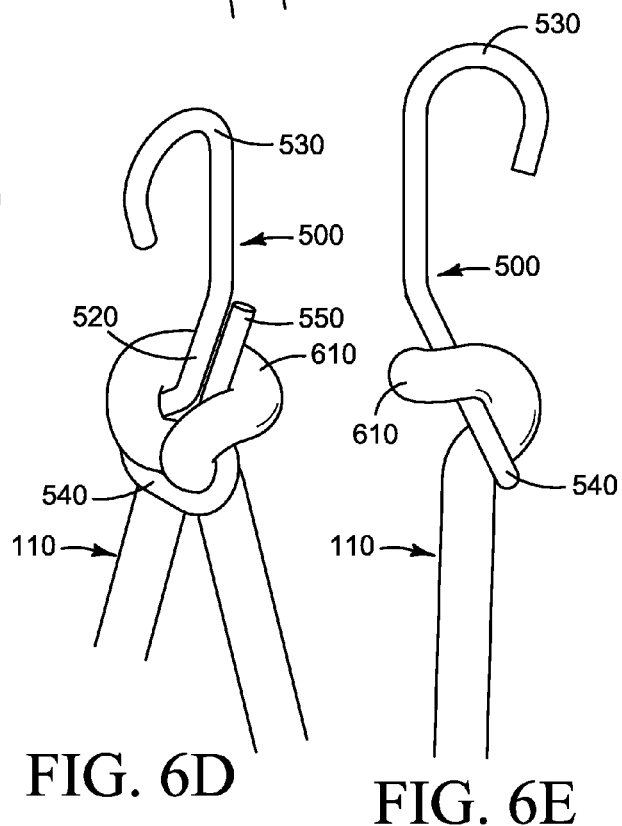
Figure 6E:
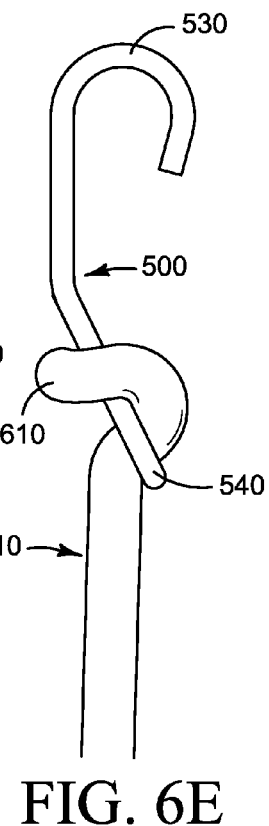
Figure 6F:
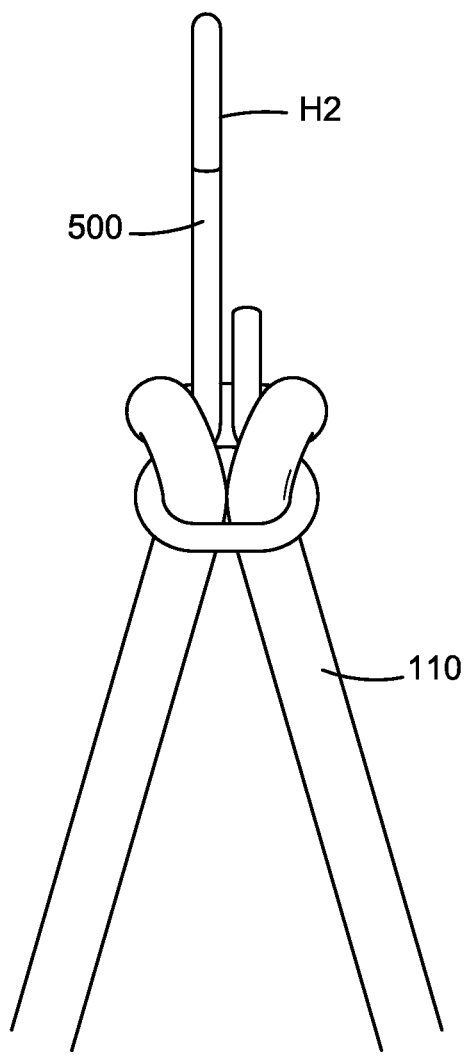
Figure 6G:
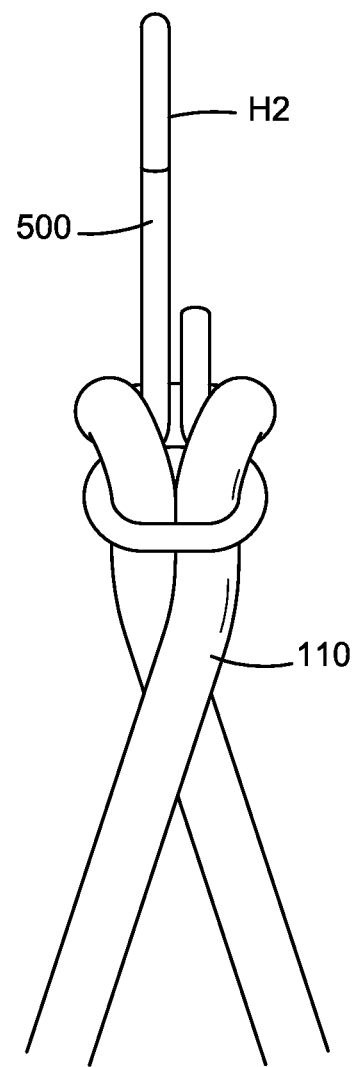

The hook 500 of FIG. 5 can be used for any of the hooks shown in FIG. 1. This includes the end hooks H1 or H6 as well as the intermediate hooks H2, H3, H4, and H5. FIGS. 6A, 6B, 6C, 6D and 6E show how the hook 500 of FIG. 5 fits onto the elastic material 110. In FIG. 6A a loop 610, also called a bight, in the elastic material 110 fits into the eye 510 of the hook 500 and over the J-shaped hook portion 530. In FIG. 6B the elastic material 110 slides down the J-shaped hook portion 530 and over the shank 520. In FIG. 6C the loop of elastic material 110 pulls tightly around the shank 520. In this manner the elastic material 110 is fixedly attached to the hook 500. FIGS. 6D and 6E show other views of the elastic material 110 installed on the hook 500. In installation on tire chains, an intermediate hook such as H2 can be installed two ways. The first way shown in FIG. 6F shows the elastic material 110 entering and leaving the hook H2 such that the elastic material does not cross over itself at the hook H2. FIG. 6G shows a case where the elastic material 110 does cross over itself as it enters and leaves the hook H2. By proper design and installation, the tire chain tightener can avoid this type of cross over, prolonging the life of the elastic material and the tire chain tightener itself.

Figure 7A:
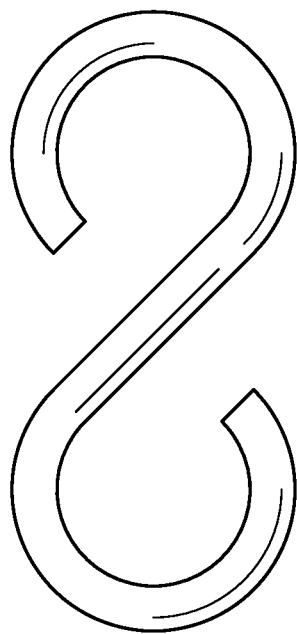
FIGS. 7A and 7B show alternative embodiments of hooks used with the tire chain tightener.
Figure 7B:
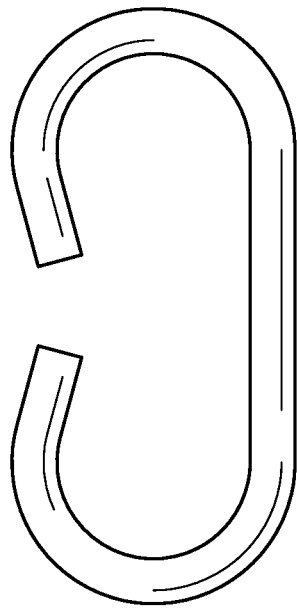

Other hook designs are possible. FIG. 7A shows an "S" hook and FIG. 7B shows a double facing "U" shaped hook. Openings of these two types of hook can be adjusted so that the elastic material is captured by the hook. The opening can be open enough to allow a the hook to fit slidingly over the elastic material or closed more tightly to have the hook fixedly attached to the elastic material.

In use the user first decides on N, the number of points for the star pattern to be formed by the tire chain tightener. In FIG. 2 for example, N=5. For a given tire chain tightener, the value of N will be one less than the number of hooks on the tire chain tightener. The method of forming the star pattern is not immediately obvious. The table below introduces a second number H which is a count number when installing the tire chain tightener. The H number is explained in the following example.

Hook Connection Chart

| N = Number of Points in the Star pattern Around the Chain Circumference | H = Next point at which to install next hook | Expressed as ordered pair of numbers (N, H) |
| --- | --- | --- |
| 3 | 1 | (3, 1) |
| 4 | 1 | (4, 1) |
| 5 | 2 | (5, 2) |
| 7 | 3 | (7, 3) |
| 8 | 3 | (8, 3) |
| 9 | 4 | (9, 4) |
| 10 | 3 | (10, 3) |
| 11 | 5 | (11, 5) |
| 12 | 5 | (12, 5) |
| 13 | 6 | (13, 6) |
| 14 | 5 | (14, 5) |
| 15 | 7 | (15, 7) |
| 16 | 7 | (16, 7) |
| 17 | 8 | (17, 8) |
| 18 | 7 | (18, 7) |
| 19 | 9 | (19, 9) |

The tire chain tightener of FIGS. 1 and 2 has six hooks. This implies that N equals five. Looking in the chart above in the row where N=5, one finds that H=2. This is expressed compactly with the ordered pair (N,H)=(5,2).

Figure 8A:
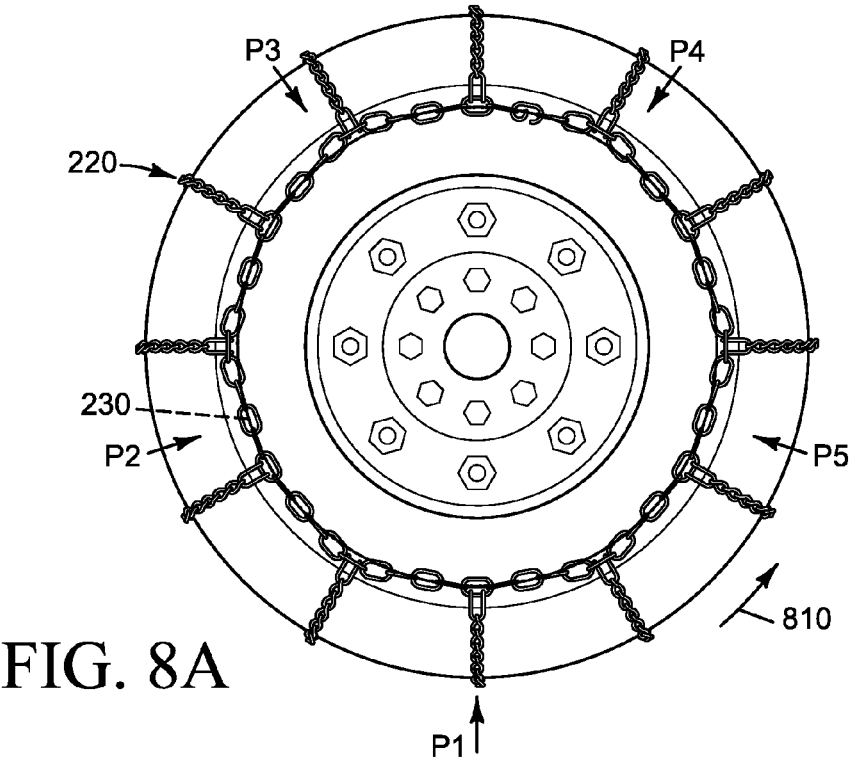
FIGS. 8A-8G show the steps of installing one embodiment of the tire chain tightener on a set of tire chains.

The user then identifies N or five substantially equally spaced points P1 through P5, around the circumference of the tire chains. This is shown in FIG. 8A.

The user then provides the appropriate tire chain tightener with a total of N+1 hooks. Two hooks are attached to the first and second ends of the elastic material as described earlier and N−1 intermediate hooks are attached to the elastic material, spaced between the first and second end hooks.

Next the user chooses a rotational direction around the circumference of the tire based on the construction of the tire chain tightener. In this example the rotational direction 810 is counter clockwise. While either direction will work, the direction is chosen based on the entry and exit of the elastic material into and out of the eye of the hook. By choosing the correct rotational direction, the elastic material will not cross over itself as it enters and exits the eye of the hook. This reduces wear and rubbing of the elastic material when in use.

Figure 8B:
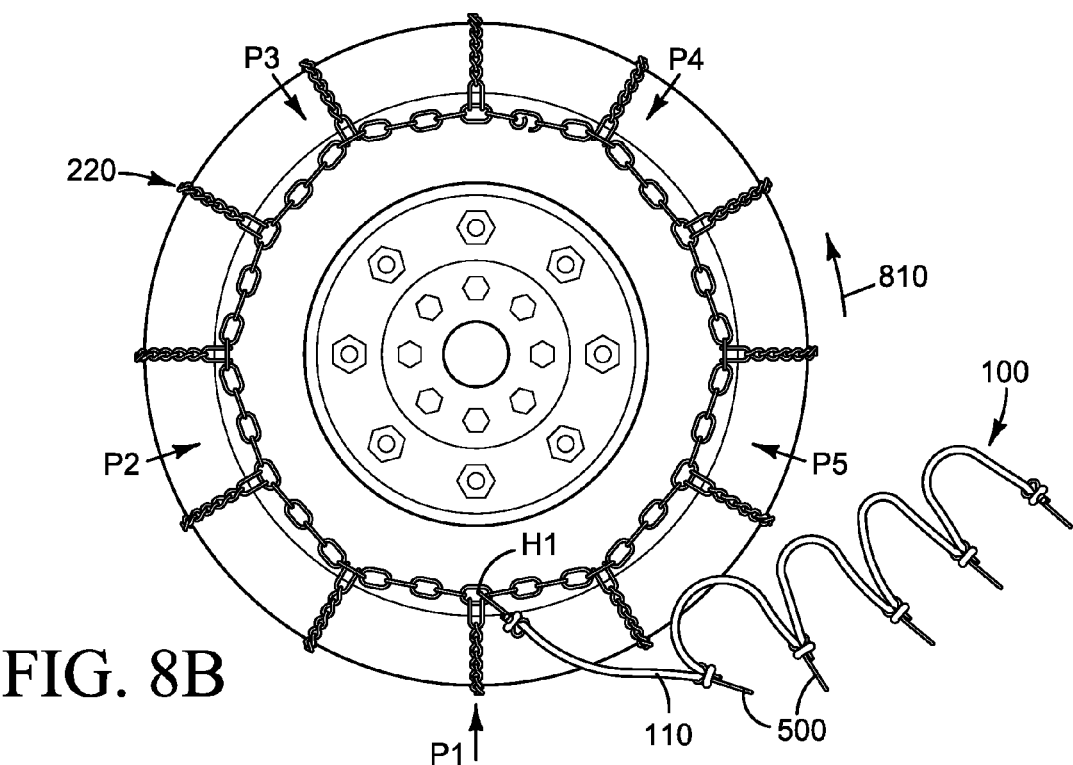

The user then attaches the first hook to one point on the tire. FIG. 8B shows the first hook H1 of the tire chain tightener connected to the first point P1 on the tire chains 220.

Figure 8C:
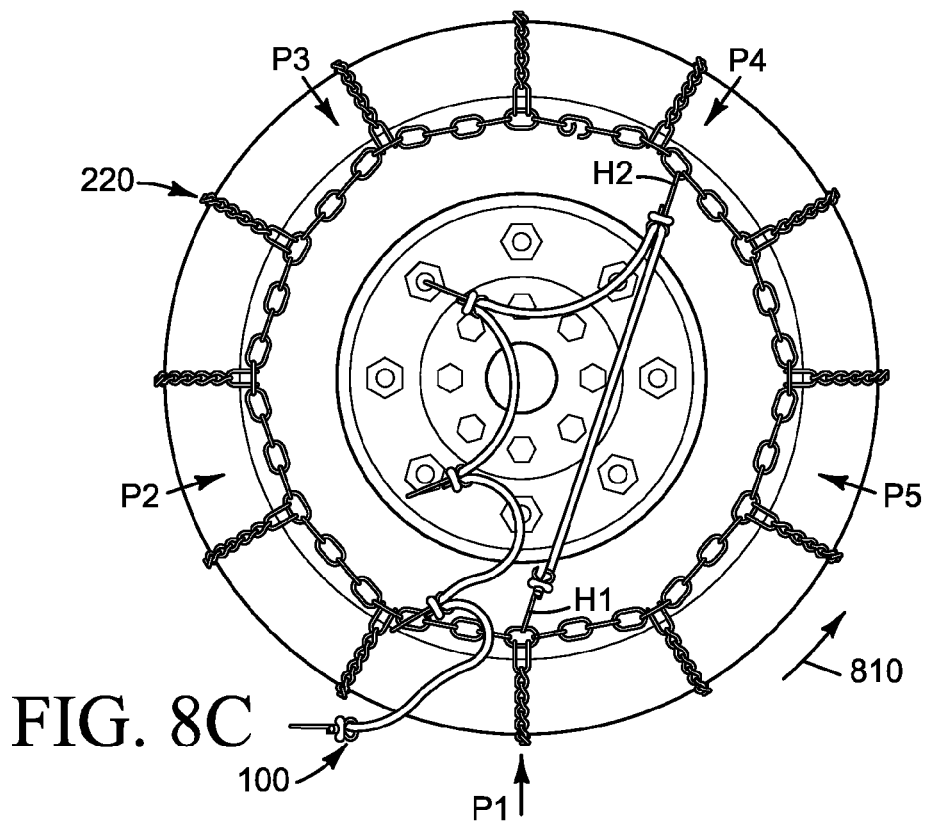

Since H equals two for N=5, the user then counts two points past the last hook installed. Since the last hook installed was H1 at point P1, the user counts in the counter clockwise direction 810 to the second point after P1. This is P4. The user then attaches the next hook on the tire chain tightener H2 to point P4 as shown in FIG. 8C.

Figure 8D:
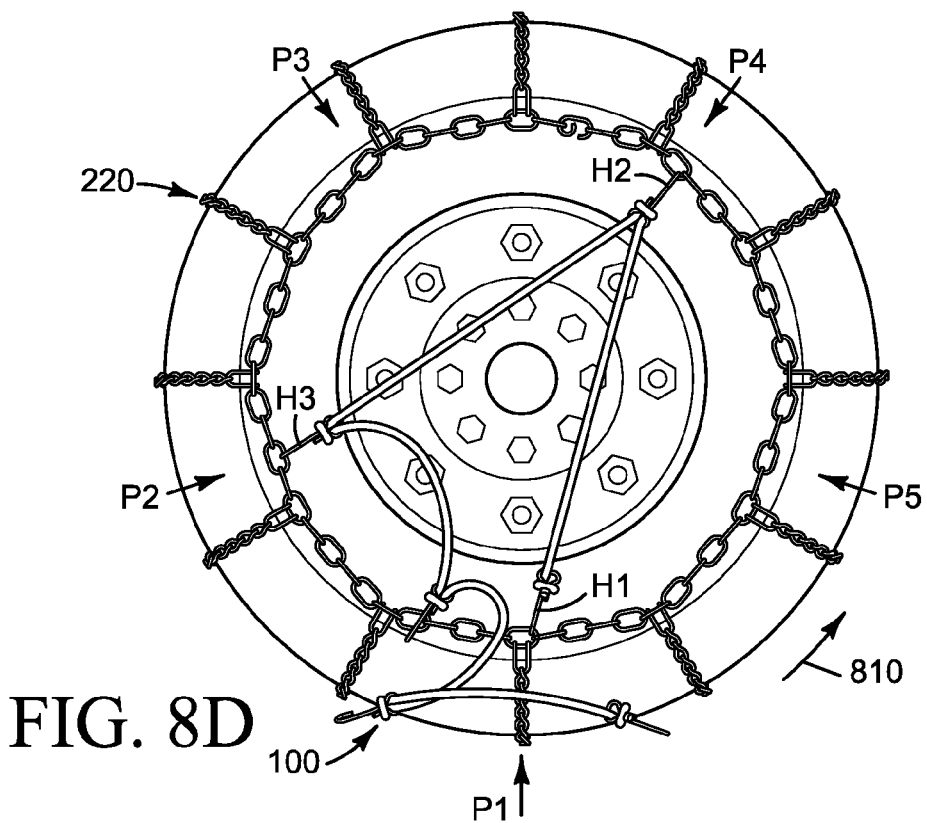

Continuing with H equals two for N=5, the user then counts two points past the last hook installed. Since the last hook installed was H2 at point P4, the user counts in the counter clockwise direction 810 to the second point after P4. This is P2. The user then attaches the next hook on the tire chain tightener H3 to point P2 as shown in FIG. 8D.

Figure 8E:
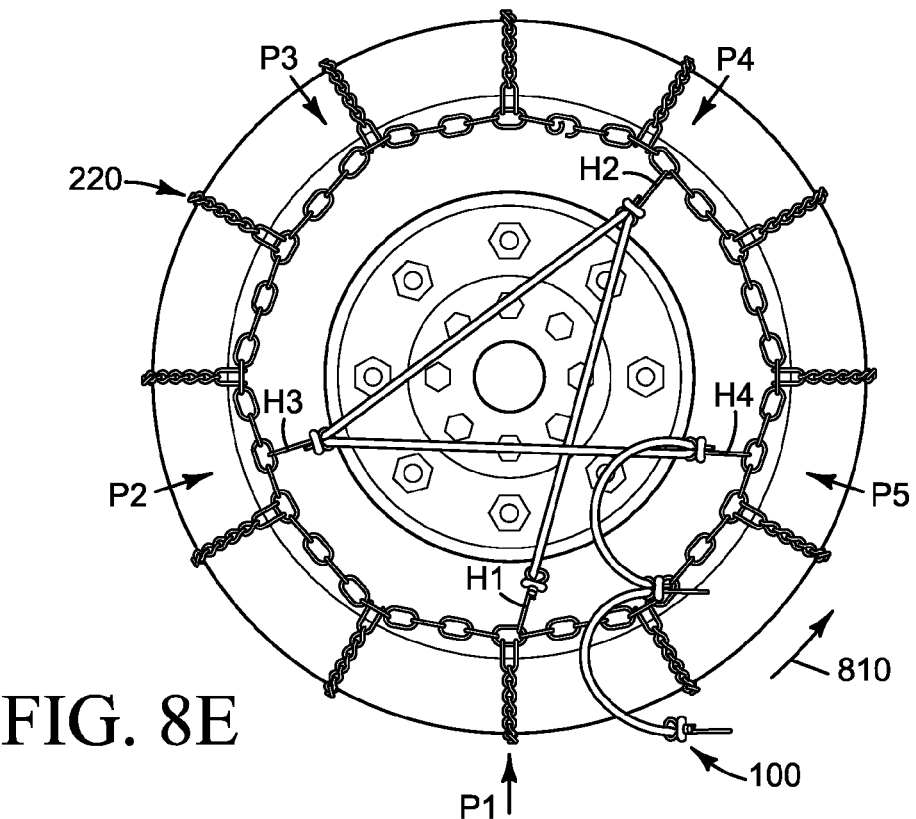

Continuing with H equals two for N=5, the user then counts two points past the last hook installed. Since the last hook installed was H3 at point P2, the user counts in the counter clockwise direction 810 to the second point after P2. This is P5. The user then attaches the next hook on the tire chain tightener H4 to point P5 as shown in FIG. 8E.

Figure 8F:
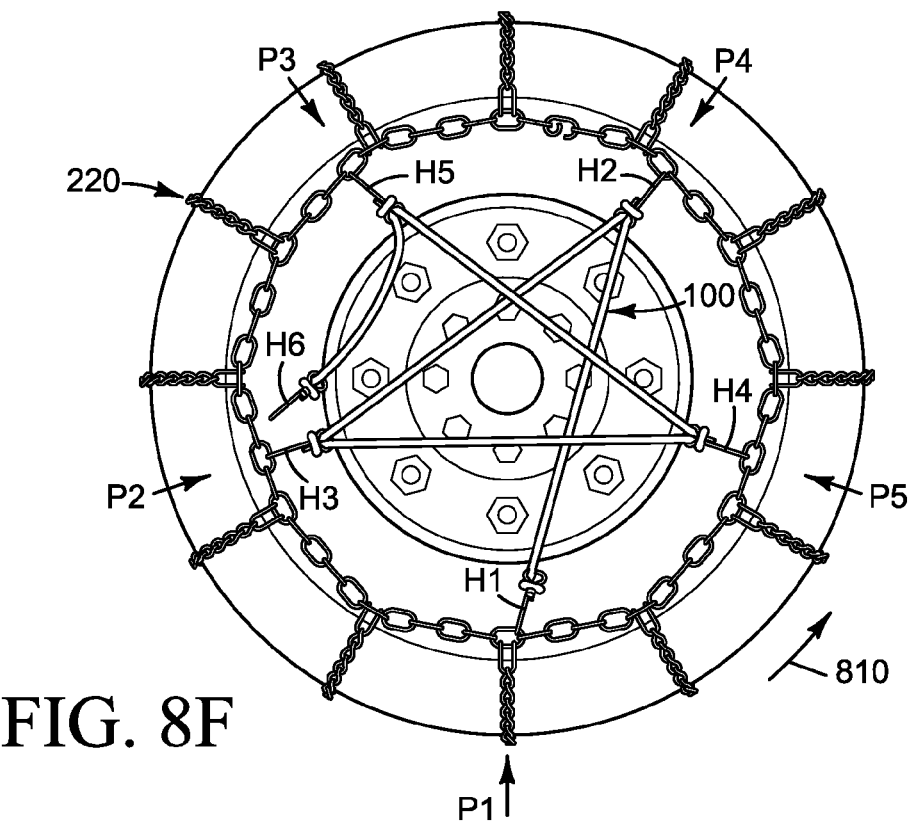

The value of H is fixed for a given number of hooks on a tire chain tightener. Continuing with H equals two for N=5, the user then counts two points past the last hook installed. Since the last hook installed was H4 at point P5, the user counts in the counter clockwise direction 810 to the second point after P5. This is P3. The user then attaches the next hook on the tire chain tightener H5 to point P3 as shown in FIG. 8F.

Figure 8G:
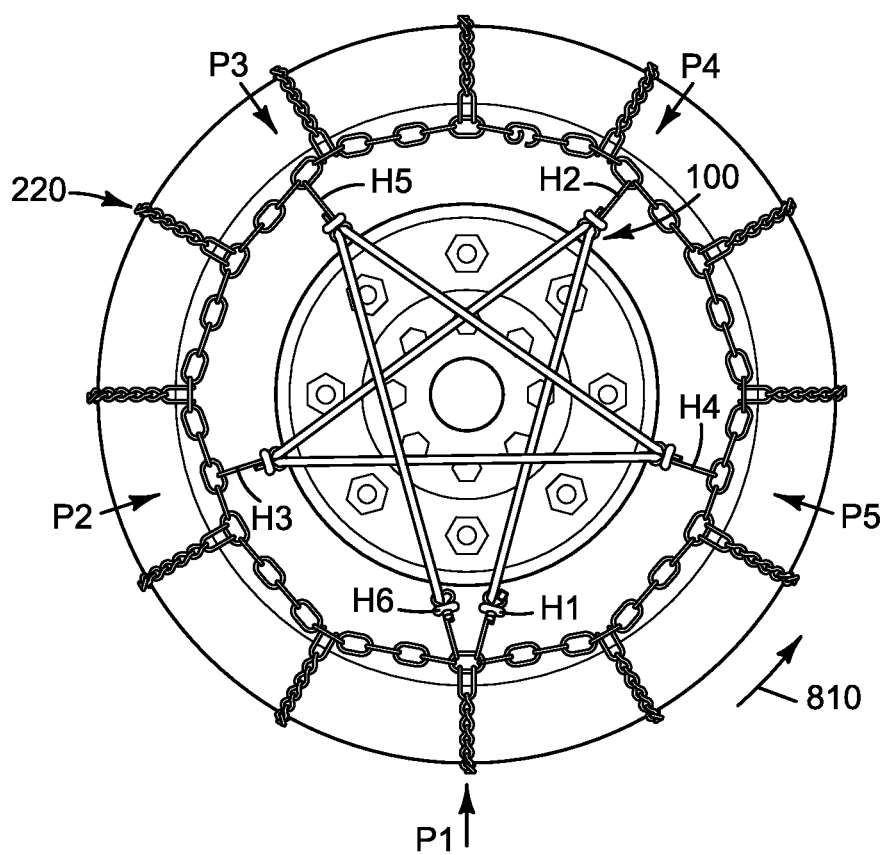

Finally, the user then counts two points past the last hook installed. Since the last hook installed was H5 at point P3, the user counts in the counter clockwise direction 810 to the second hook after P3. This is P1. The user then attaches the next hook on the tire chain tightener H6 to point P1 as shown in FIG. 8G. This completes the installation of the tire chain tightener forming the five pointed star.

Note that in the example of FIGS. 8A through 8G several variations are possible. The intermediate hooks H2 through H5 between the two ends can be slideably or fixedly attached to the elastic material. Similar tensions in the segments of the elastic material between the hooks will result if the hooks are fixedly attached, with equal spacing between the hooks. If the intermediate hooks are slideably attached, the tension throughout the elastic material will tend to equalize by itself. The selected points along the circumference of the tire chains does not need to be exact but can be approximate to give a workable star pattern. Similarly, the spacing between the hooks on the elastic material can also be approximate and still yield good results.

Note also that when the user attaches one hook to the chain, that only one segment of the elastic material between two hooks is stretched at a time. This reduces the strength needed to stretch and hook the tire chain tightener onto the circumference of the tire chains. Other types of tire chain tighteners require the last hook installed to stretch two sections of elastic. This results in a greater force requirement and limits who is strong enough to install a tire chain tightener. The tightener disclosed herein has the advantage that people of lesser strength can still install it.

To promote the proper installation of the tire chain tightener, the first hook attached to the first end, is uniquely identified, distinguishing it from the second end. This identification can take many forms such as a band, color or other identifying mark. The purpose of the identification is to avoid the cross over of the elastic material as it enters and exits the intermediate hooks. Avoiding this cross over, as discussed in conjunction with FIGS. 6F and 6G prolongs the life of the tire chain tightener. Also, for a pre-assembled tire chain tightener of N+1 hooks, the direction, clockwise or counter clockwise, and the count value H can be marked on the first end. For example, a colored identifying sleeve on the first hook of a six hook tire chain tightener could have "CCW-2". This would indicate that the user installs the tire chain tightener working counter clockwise around the circumference of the tire chains, connecting the next hook to the second point encountered.

It will be appreciated that the invention is not limited to what has been described herein above merely by way of example. While there have been described what are at present considered to be the preferred embodiments of this invention, it will be obvious to those skilled in the art that various other embodiments, changes, and modifications may be made therein without departing from the spirit or scope of this invention and that it is, therefore, aimed to cover all such changes and modifications as fall within the true spirit and scope of the invention, for which letters patent is applied.

I claim:

1. A method for tightening tire chains on a tire, the tire chains describing a circumference, the method comprising:
   a. choosing an ordered pair (N,H) from the group of ordered pairs consisting of (3,1), (4,1), (5,2), (7,3), (8,3), (9,4), (10,3), (11,5), (12,5), (13,6), (14,5), (15,7), (16,7), (17,8), (18,7), and (19,9);
   b. Identifying N substantially equally spaced points, around the circumference of the tire chains;
   c. providing a tire chain tightener comprising:
      a linear elastic member having a first end and a second end;
      a first hook attached to the first end;
      an N+1 hook attached to the second end;
      a plurality of N−1 hooks attached to the linear elastic member, the N−1 hooks spaced between the first end and the second end;
   d. choosing a rotational direction around the circumference of the tire chains;
   e. attaching the first hook to one point on the tire chains;
   f. counting H number of points on the circumference of the tire chains in the chosen rotational direction, from the last hook attached and attaching the next hook to the Hth point;
   g. repeating step f. until all the hooks are attached to the tire chains.

2. The method of claim 1 wherein the plurality of N−1 hooks, spaced between the first end and second end, are fixedly attached to the linear elastic member.

3. The method of claim 1 wherein the plurality of N−1 hooks, spaced between the first end and second end, are slideably attached to the linear elastic member.

4. The method of claim 1 wherein the a plurality of N−1 hooks, are spaced substantially equally between the first end and second end.

5. The method of claim 1 wherein N equals five, the N−1 hooks are fixedly attached to the linear elastic member and the N−1 hooks are spaced substantially equally between the first end and second end.

6. The method of claim 1 wherein the first hook attached to the first end, is uniquely identified, distinguishing it from the second end.

7. The method of claim 1 wherein the step of choosing a rotational direction around the circumference of the tire chains, is chosen such that the elastic member does not cross over itself when a hook is attached to the tire chains.

8. A hook for a tire chain tightener using an elastic material, the hook comprising:
   an eye, contained in a first plane, the eye adapted to contain two passes of the elastic material;
   a J-shaped hook portion contained in a second plane perpendicular to the first plane, the J-shaped hook portion comprising:
   a shank extending outwardly from the eye, and
   an open hook end extending from the shank in a J-shape;
   the hook further comprising the elastic material, attached to the hook, the elastic material formed into a loop, the loop passing through the eye and over the shank.

9. A hook for a tire chain tightener using an elastic material, the hook comprising:
   an eye, contained in a first plane, the eye adapted to contain two passes of the elastic material;
   wherein the eye is substantially oval shaped, with a major width approximately twice the size of the cross section of the elastic material and a minor width approximately the size of the cross section of the elastic material, wherein a shank extends outwardly from the eye parallel to the minor width the shank rising out of the first plane at an acute angle;
   the hook further comprising the elastic material, the elastic material formed into a loop, the loop passing through the eye and over the shank; and
   a J-shaped hook portion contained in a second plane perpendicular to the first plane, the J-shaped hook portion extending outwardly from the shank in a J-shape.

* * * * *